United States Patent
Clover et al.

(10) Patent No.: US 11,331,740 B2
(45) Date of Patent: May 17, 2022

(54) IGNITION DEVICE COMPONENT PRODUCED BY COLD METAL TRANSFER PROCESS

(71) Applicant: Johnson Matthey Public Limited Company, London (GB)

(72) Inventors: Michael Clover, Hertfordshire (GB); Stephan Herbst, Hertfordshire (GB)

(73) Assignee: Johnson Matthey Public Limited Company, London (GB)

( * ) Notice: Subject to any disclaimer, the term of this patent is extended or adjusted under 35 U.S.C. 154(b) by 320 days.

(21) Appl. No.: 16/634,222

(22) PCT Filed: Aug. 1, 2018

(86) PCT No.: PCT/GB2018/052197
§ 371 (c)(1),
(2) Date: Jan. 27, 2020

(87) PCT Pub. No.: WO2019/025796
PCT Pub. Date: Feb. 7, 2019

(65) Prior Publication Data
US 2021/0086279 A1    Mar. 25, 2021

(30) Foreign Application Priority Data

Aug. 3, 2017   (GB) .................................. 1712503

(51) Int. Cl.
*B23K 9/04*   (2006.01)
*H01T 13/39*   (2006.01)
(Continued)

(52) U.S. Cl.
CPC .............. *B23K 9/042* (2013.01); *B23K 9/173* (2013.01); *B23K 9/232* (2013.01);
(Continued)

(58) Field of Classification Search
CPC ........ B23K 9/042; B23K 9/173; B23K 9/232; B23K 35/0261; B23K 35/304;
(Continued)

(56) References Cited

U.S. PATENT DOCUMENTS 4,365,137 A   12/1982   Tarasov et al.
4,826,462 A    5/1989   Lenk
(Continued)

FOREIGN PATENT DOCUMENTS

AT    513428 A1    4/2014
CN    102133677 A   7/2011
(Continued)

OTHER PUBLICATIONS

Cold_metal_transfer___CMT___technology_-_An_overview.pdf (Year: 2012).*
(Continued)

*Primary Examiner* — Tracie Y Green
(74) *Attorney, Agent, or Firm* — BakerHostetler (57) ABSTRACT

The present invention relates to noble metal-containing components prepared by cold metal transfer (CMT) methods, along with methods of preparing such components by CMT. More especially, an advantageous method of preparing a platinum metal group metal or alloy containing ignition device component by CMT is provided.

20 Claims, 2 Drawing Sheets

(51) Int. Cl.
*H01T 21/02* (2006.01)
*B23K 9/23* (2006.01)
*B23K 9/32* (2006.01)
*B23K 35/30* (2006.01)
*B23K 35/02* (2006.01)
*B23K 9/173* (2006.01)
*B23K 35/32* (2006.01)
*B23K 101/36* (2006.01)
*B23K 101/00* (2006.01)

(52) U.S. Cl.
CPC ........ *B23K 35/0261* (2013.01); *B23K 35/304* (2013.01); *B23K 35/322* (2013.01); *H01T 13/39* (2013.01); *H01T 21/02* (2013.01); *B23K 2101/006* (2018.08); *B23K 2101/36* (2018.08)

(58) Field of Classification Search
CPC ............ B23K 35/322; B23K 2101/006; B23K 2101/36; B23K 35/3033; B23K 9/04; H01T 13/39; H01T 21/02; C22C 19/00; C22C 19/03
See application file for complete search history.

(56) References Cited

U.S. PATENT DOCUMENTS

| | | | |
|---|---|---|---|
| 7,851,984 | B2 | 12/2010 | Zdeblick et al. |
| 2002/0014005 | A1 | 2/2002 | Niessner |
| 2003/0178925 | A1 | 9/2003 | Kumagai et al. |
| 2007/0103046 | A1 | 5/2007 | Tinwell |
| 2007/0221631 | A1* | 9/2007 | Ruokolainen .......... B23K 9/173 219/121.11 |
| 2008/0036353 | A1 | 2/2008 | Zdeblick et al. |
| 2008/0050264 | A1 | 2/2008 | Lykowski et al. |
| 2009/0140625 | A1 | 6/2009 | Kato |
| 2011/0073579 | A1 | 3/2011 | Artelsmair et al. |
| 2021/0086287 | A1* | 3/2021 | Wang .................... B23K 11/16 |

FOREIGN PATENT DOCUMENTS

| | | |
|---|---|---|
| DE | 10 2011 007694 A1 | 10/2012 |
| DE | 10 2012 212042 A1 | 1/2014 |
| DE | 102014216293 A1 | 2/2016 |
| EP | 1517420 A2 | 3/2005 |
| JP | 2003010969 A | 1/2003 |
| JP | 2010170705 A | 8/2010 |
| WO | 2009/034318 A1 | 3/2009 |
| WO | 2009034318 A1 | 3/2009 |

OTHER PUBLICATIONS

Microstructure_characteristics_and_mechanical.pdf (Year: 2018).*
International Search Report of the International Searching Authority for PCT/GB2018/052197 dated Nov. 7, 2018.

* cited by examiner

IGNITION DEVICE COMPONENT PRODUCED BY COLD METAL TRANSFER PROCESS

TECHNICAL FIELD

The present invention relates generally to noble metal-containing components prepared by cold metal transfer (CMT) methods, along with methods of preparing such components by CMT. More especially, an advantageous method of preparing a platinum metal group metal or alloy containing ignition device component by CMT is provided.

BACKGROUND ART

It is often necessary or desirable to attach a noble metal or noble metal-containing alloy to another metal or alloy to form an assembly. The other metal or alloy may also be noble metal-based or it may be another type of metal or alloy. The noble metals consist of ruthenium (Ru), rhodium (Rh), palladium (Pd), silver (Ag), osmium (Os), iridium (Ir), platinum (Pt) and gold (Au).

The joining of a metal or alloy to another metal or alloy to form an assembly is also necessary when manufacturing ignition system devices, such as spark plugs. Such devices include components such as a central electrode which is usually connected to the ignition system, and a ground or side electrode which is grounded by connection to the metal shell of the ignition device. The tips of the ignition device component (for example, the tip of the central electrode or ground electrode), from which a spark is generated during use, often (but not always) consists of a noble metal or noble metal-containing alloy (for example a metal or alloy comprising gold, silver, ruthenium, rhodium, palladium, osmium, iridium or platinum). The reason for this is that the tip of the electrode must be able to withstand very harsh conditions of high temperature and high voltage during operation of the device and so must be made from more resilient and often more expensive material. The remainder of the electrodes, which do not experience such harsh conditions, are often formed from different, less expensive metal or alloy materials (for example Ni—Cr alloy and/or copper).

A common way to manufacture the electrode in such ignition system devices is to draw noble metal (for example, a platinum group metal (PGM)) and base metal (typically Inconel, a Ni—Cr alloy) wires. These wires are then fed in such a way that the metals touch and a laser or friction weld is carried out. Typically, once welded, the noble metal and base wire assembly is then cut on both sides, such that a welded small stub of material is formed. Typically, the base metal element of this stub is then itself welded onto a substrate to form the electrodes, after each substrate has been (separately) independently manufactured. Commonly used substrates for this purpose are based on Inconel, a Ni—Cr alloy, with a Cu core. Such substrates are pre-formed by the co-extrusion of the two metals and are well-known.

An alternative method currently used to manufacture the electrode in such devices is to laser-weld a piece or 'slug' of sectioned Pt wire onto the substrate to form the electrode tip, after each substrate has been independently manufactured.

A common way to manufacture the electrode in such devices is to laser-weld a piece or 'slug' of sectioned noble metal wire onto the substrate to form an electrode tip, after each substrate has been independently manufactured. Commonly used substrates for this purpose are based on Inconel, a Ni—Cr alloy, with a Cu core. Such substrates are pre-formed by the co-extrusion of the two metals and are well-known.

These existing manufacturing processes have some benefits in that the amount of expensive noble metal used is minimised relative to the use of an electrode which is entirely noble metal-based.

However, the processes are complex and expensive due to the need to prepare the metal wires in an upstream process, section them and perform the necessary welding steps, either to laser-weld each wire section onto a substrate to form the electrode tip or to friction weld the two wires. Cutting of wire results in kerf loss (the inevitable loss of material when a cutting tool passes through a wire during sectioning). If a shaped electrode tip (such as a tapered tip) is desired, the end of the slug must be shaped by machining, with inevitable further material loss. Existing processes also lack flexibility because a specific length of sectioned wire must be used in order to provide the desired corresponding length of electrode tip. As a result, it may be necessary to prepare and make available a wide variety of lengths of sectioned wire in a preliminary stage of the process, which is complex. The handling of slugs and other small portions of wire is difficult and results in further losses.

There is a need for simpler, more cost-effective processes for the manufacture of noble metal-containing components, and more specifically for the manufacture of components for ignition devices.

Any sub-titles herein are included for convenience only, and are not to be construed as limiting the disclosure in any way.

The disclosure of all references cited herein, inasmuch as it may be used by those skilled in the art to carry out the invention, is hereby specifically incorporated herein by cross-reference.

SUMMARY OF THE INVENTION

Accordingly, a first aspect of the invention is a process for the production of an ignition device component by cold metal transfer comprising:
(i) providing a metal or alloy substrate and a metal or alloy feed wire, wherein the feed wire comprises a platinum group metal or alloy thereof;
(ii) igniting an electric arc between the substrate and the feed wire;
(iii) decreasing the distance between a surface of the substrate and the feed wire until the feed wire contacts the substrate, thereby creating a short-circuit; and
(iv) increasing the distance between the substrate and the feed wire to break the short circuit and deposit metal or alloy from the feed wire onto the surface of the substrate to form a metal or alloy attachment on the surface of the substrate.

It will be understood that in this context 'platinum group metal' refers to the elements ruthenium (Ru), rhodium (Rh), palladium (Pd), osmium (Os), iridium (Ir), and platinum (Pt).

A second aspect of the invention is an ignition device component obtained or obtainable by a process according to the first aspect.

A third aspect of the invention is an ignition device comprising a component according to the second aspect.

A fourth aspect of the invention is an engine comprising an ignition device according to the third aspect.

A fifth aspect is the use of an ignition device component according to the second aspect in an ignition device, preferably as an electrode in an ignition device.

The inventors have found that a cold metal transfer (CMT) method for the manufacture of ignition device components, such as electrodes for ignition devices, offers a very efficient means to produce the components with minimal wasted material. Additional time-consuming and loss generating manufacturing processes for the preparation of sectioned wire and its subsequent attachment to a substrate are avoided. Moreover, the geometry of the deposited attachment is customisable to suit the particular application, and a strong bond is formed between the substrate and the attachment.

The CMT process is loss-free and therefore much more desirable than the sectioning and laser welding of PGM wire.

The present CMT method can be used to directly produce a shaped attachment without any material loss and without the need for separate machining steps. It is also possible to use the same length of feed wire and tailor the resulting attachment length simply by selection of suitable CMT process parameters, rather than requiring a range of sectioned wire lengths to be available from an earlier sectioning process.

A sixth aspect of the invention is a process for the production of a noble metal-containing component by cold metal transfer comprising:
(i) providing a metal or alloy substrate and a feed wire, wherein the feed wire comprises a noble metal or noble metal-containing alloy;
(ii) igniting an electric arc between the substrate and the feed wire;
(iii) decreasing the distance between a surface of the substrate and the feed wire until the feed wire contacts the substrate, thereby creating a short-circuit; and
(iv) increasing the distance between the substrate and the feed wire to break the short circuit and deposit metal or alloy from the feed wire onto the surface of the substrate to form a metal or alloy attachment on the surface of the substrate.

It will be understood that in this context 'noble metal' refers to the elements ruthenium (Ru), rhodium (Rh), palladium (Pd), silver (Ag), osmium (Os), iridium (Ir), platinum (Pt) and gold (Au). The noble metal may be a platinum group metal (PGM), i.e. selected from the elements ruthenium (Ru), rhodium (Rh), palladium (Pd), osmium (Os), iridium (Ir) and platinum (Pt). Preferably, the noble metal is selected from the elements ruthenium (Ru), rhodium (Rh), palladium (Pd), iridium (Ir) and platinum (Pt).

DETAILED DESCRIPTION OF THE INVENTION

Metal or Alloy Feed Wire

According to the process of the invention, metal or alloy from a feed wire is deposited onto a substrate by CMT to form an attachment on the substrate. CMT effectively forms a weld joint at the junction between the surface of the substrate and the deposited attachment. The attachment is therefore not simply deposited onto the surface but becomes securely fixed to the substrate.

Preferably, metal from a feed wire is deposited onto the substrate by CMT to form an attachment on the substrate.

The feed wire may comprise of one or more metals selected from Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au.

Preferably, the feed wire comprises or consists of one or more metals selected from Ru, Rh, Pd, Ag, Os, Ir, Pt and Au. More preferably, the feed wire comprises or consists of one or more metals selected from Au, Ag, Ru, Rh, Pd, Ir and Pt. Most preferably, the feed wire comprises or consists of one or more metals selected from Ru, Rh, Pd, Ir and Pt. Optionally, the feed wire comprises or consists of two or more metals selected from Ru, Rh, Pd, Ag, Os, Ir, Au and Pt. In this case, preferably, the feed wire comprises or consists of two or more metals selected from Ru, Rh, Pd, Ag, Ir, Au and Pt. More preferably, the feed wire comprises or consists of two or more metals selected from Ru, Rh, Pd, Ir, and Pt. Most preferably, the feed wire comprises or consists of one or more metals selected from Ru and Ir.

Preferably, alloy from a feed wire is deposited onto a substrate by CMT to form an attachment on the substrate.

Suitably, the feed wire comprises or consists of an alloy of one or more of Ru, Rh, Pd, Ag, Os, Ir, Pt and Au with one or more other elements, for example one or more other metals. The one or more other elements in the alloy may be selected from Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au. Preferably, the feed wire comprises or consists of an alloy of one or more of Ru, Rh, Pd, Ag, Ir, Pt and Au, with one or more other elements, for example one or more other metals. More preferably, the feed wire comprises or consists of an alloy of one or more of Ru, Rh, Pd, Ir and Pt with one or more other elements, for example one or more other metals. Most preferably, the alloy comprises or consists of an alloy of one or more of Ru and Ir with one or more other metals, and it is particularly preferred that the alloy comprises or consists of an alloy containing Ru or Ir as the primary component, with one or more other metals, such alloys having particular utility in ignition devices.

Additionally, or alternatively, the alloy comprises or consists of an alloy of two or more of Ru, Rh, Pd, Ag, Os, Ir, Pt and Au.

Optionally, the alloys contain additional components selected from one or more of Y (yttrium), Zr (zirconium) and Sm (samarium). Preferably, the alloys contain Zr. Without wishing to be bound by theory, it is believed that the inclusion of these elements may ductilise the alloys. It is also believed that these elements (in particular Zr) may hinder the dislocation movement through grain boundaries (i.e. the boundaries between crystal lattices at different orientations) and hence limit or slow grain growth.

Additionally, or alternatively, the alloy may comprise other, non-alloy components. For example, in some embodiments, the alloy also comprises a ceramic oxide component. Without wishing to be bound by theory, it is believed that the presence of such ceramic oxide may increase grain stabilisation of the alloy and improve spark erosion properties (which may be advantageous in ignition device components in particular). Non-limiting examples of such ceramic oxides are $Y_2O_3$, $ZrO_2$, and rare earth oxides.

Suitably, the metal or alloy deposited onto the substrate comprises a noble metal or alloy thereof. More preferably, the metal or alloy deposited onto the substrate comprises a PGM or alloy thereof.

Preferable features described in relation to process for the production of a component of an ignition device (first aspect of the invention) apply equally to the process for the production of a noble metal-containing component (sixth aspect of the invention), with the proviso that the production of the noble metal-containing component is limited to a method comprising:

(i) providing a metal or alloy substrate and a feed wire, wherein the feed wire comprises a noble metal or noble metal containing alloy;

Whereas, the production of an ignition device component is limited to a method comprising:

(i) providing a metal or ally substrate and a feed wire, wherein the feed wire comprises a platinum group metal or platinum group metal containing alloy.

The diameter of the feed wire used will depend on the desired diameter of attachment. Suitably, the metal or alloy feed wire has a diameter of at least 0.3 mm, for example at least 0.4 mm or at least 0.5 mm. Suitably, the attachment has a diameter of up to 2.5 mm, for example up to 2 mm or up to 1.5 mm. Any suitable method known to the skilled person may be used to manufacture a metal or alloy feed wire of the appropriate composition and size.

Metal or Alloy Substrate

In the process according to the invention, the attachment which is manufactured by CMT is deposited on and fixed to a surface of a metal or alloy substrate.

The substrate may comprise any suitable metal or alloy, or mixture of metals and/or alloys. In some embodiments, the substrate is a body formed by the co-extrusion of two different metals or alloys or any other method of fabrication known to the skilled person.

In some embodiments, the substrate comprises a metal or alloy different to the metal or alloy which is deposited on the substrate by CMT. In some embodiments, the substrate does not comprise any metal or alloy which is present in the feed wire or in the material deposited on the substrate. In some embodiments, the substrate does not comprise any PGM.

The substrate may preferably be a portion of a central or ground electrode of an ignition device. The attachment then forms the 'tip' of the electrode from which a spark may be generated during use. The substrate more preferably may be a portion of a central electrode of an ignition device. As will be appreciated, this is a preferred feature of the process for producing an ignition device.

The substrate may comprise a conductive metal or alloy. Preferably, the substrate comprises one or more metals selected from Ag, Au, Cu, Al, Mo, Zn, W, Ni, Fe, Pd, Pt, Sn, Pb, Ti or an alloy of any one of these with one or more other elements, for example one or more other metals. More preferably, the substrate comprises one or more metals selected from Cu and Ni or an alloy of any one of these with one or more other elements, for example one or more other metals, and this feature is particular preferred in the process for producing an ignition device.

Optionally, the substrate comprises a first region comprising a first metal or alloy and a second region comprising a second metal or alloy, different from the first metal or alloy. Preferably, the first region is a core region (core) which is surrounded at least in part by the second region (shell). The first and second regions may be formed by the co-extrusion of the first and second metals or alloys. In some embodiments, the first region comprises or consists of a conductive metal. In some embodiments, the first region comprises or consists of a transition metal, such as Cu. In some embodiments, the second region comprises or consists of a conductive metal. In some embodiments, the second region comprises or consists of an alloy, such as a Ni alloy. In some embodiments, the second region comprises or consists of Inconel. Preferably, the substrate comprises a core comprising Cu surrounded at least in part by an external portion (shell) comprising Ni or an alloy of Ni, such as Inconel.

It will be appreciated, from consideration of the disclosure above in relation to the substrate, that the surface onto which the wire is deposited during CMT may comprise Ni or an alloy of Ni, such as Inconel, and preferably the surface may comprise Ni or an alloy of Ni. In the alloy of Ni, the primary component may be Ni and the other element(s) in the alloy of Ni may be selected from Cr, Fe, Mo, Nb, Co, Mn, Cu, Al, Ti, Si, C, S, P and B. Optionally, the most abundant element in the alloy is Ni, the second most abundant element in the alloy is Cr and the alloy may comprise one or more other alloyed elements selected from Fe, Mo, Nb, Co, Mn, Cu, Al, Ti, Si, C, S, P and B. In some embodiments, the alloy is Inconel.

Such "core-shell" type substrates for use as part of an ignition device electrode are well-known to the skilled person and commercially available.

The overall shape of the substrate is not particularly limited. The skilled person will be able to select a suitable shape depending on the intended ignition device (or component) application.

Preferably, the substrate has an elongate structure. Such substrates have one dimension which is longer than the other two dimensions by a factor of at least 2, for example at least 3, for example at least 4. The cross-sectional geometry of such elongate substrates is not particularly limited but may be selected from circular, elliptical, triangular, square, rectangular, trapezoid, rhombic, pentagonal, hexagonal or octagonal. Such substrates may comprise features on the surface of the substrate, such as ridges, bosses or recesses.

More preferably, the substrate is substantially cylindrical. Central electrodes of ignition devices such as spark plugs are often of cylindrical shape, the 'tip' of the electrode from which a spark is generated being located at one end of the cylinder. As a result, in some embodiments the surface of the cylindrical substrate onto which material is deposited by CMT is one of the end surfaces of the cylinder, which may be substantially planar.

By "substantially cylindrical", we mean that the substrate will generally be of elongate structure with a circular or close to circular cross-section (for example, the cross section may be slightly elliptical in shape rather than a perfect circle). Furthermore, "substantially cylindrical" does not exclude the presence of features on the surface of the substrate, such as ridges, bosses or recesses. The size and shape of the cross section of the substrate may be consistent along its length or may vary, for example such that the substrate has a tapered appearance.

The size of the substrate is also not particularly limited and will depend upon the intended application of the ignition device (or component). As already mentioned, such substrates are commercially available and the process described herein may be adapted to be used with any such substrate. Generally, the substrate may have a length of 0.5 to 80 mm, for example 10 to 20 mm, depending on the design and the intended use.

In the processes of the invention, a quantity of metal or alloy from the feed wire is deposited onto a surface of the metal or alloy substrate and becomes mechanically bonded to the substrate by a weld-joint formed in the CMT process. This bond is much stronger than would be formed from mere deposition of molten metal onto a surface. A single deposit of metal or alloy may be made from the feed wire onto the substrate. The metal or alloy may cover the entire area of an exposed surface of the substrate once deposited, although multiple deposits are also contemplated and may be achieved by repetition of the steps of the processes described herein. Alternatively, the metal or alloy may be deposited to cover only a portion of an exposed surface of the substrate. When the substrate is an elongate substrate, for example a substantially cylindrical as discussed above, the metal or alloy may be deposited onto one of the end faces of the substrate.

In the sixth aspect of the invention, the substrate may be an ignition device component, for example an ignition device electrode, for example a spark plug electrode. Alternatively, the substrate of the sixth aspect may be any other suitable metal or alloy substrate, for example a lead-out wire of a sensor.

Cold Metal Transfer Manufacturing Process

Cold metal transfer (CMT) is a process whereby material from a feed wire is transferred to a substrate, under relatively 'cold' conditions (when compared with traditional arc welding techniques). For use in welding applications, CMT has been proposed as an alternative welding process to electric arc welding, due to the automation offered by CMT, the reduced thermal input and the formation of a cleaner weld to join the workpieces. See for example US 2009/026188 A1 and US 2008/156781 A1, the contents of which are incorporated herein by reference. Such weld processes may be known by different terminology depending on the manufacturer of the welding system. For example, the terms ColdArc (used by EWM), RMD ball transfer (used by Miller), CBT (used by Daihen), ColdMIG (used by Merkle) and STT (used by Lincoln) are all known, and all rely on the same principles to weld by cold metal transfer.

The CMT process used in the present application is different from the above-described CMT weld processes. Instead of depositing a weld bead by CMT, the processes described herein transfer a section of the feed wire to the substrate by CMT, thereby forming a substantially elongate attachment on the substrate. Such processes have been known by the names 'CMT-pin', 'CMT-pike', 'CMT-ball', 'CMT-cone' and 'CMT-print', and are described for example in US 2011/0073579 A1, the contents of which are incorporated herein by reference.

The inventors have discovered that CMT also offers the possibility to produce components for ignition devices in an economical way while preserving desirable properties.

In addition, the inventors have discovered that more generally CMT offers the possibility to produce noble metal-containing components in an economical way while preserving desirable properties. For example, such processes would find use in the manufacture of sensor attachments, such as lambda sensor attachments, and various other uses where the attachment of a noble metal attachment onto another metal or alloy substrate is required, where such components may otherwise be manufactured using the less economical processes described above, such as laser welding.

In the CMT process according to the invention, the metal or alloy attachment is fully formed onto the substrate in a single sequence of steps performed by a CMT system, and little or no post-processing (such as finishing or isostatic pressing) is necessary.

The general process of the invention comprises four main steps:
  (i) providing a metal or alloy substrate and a metal or alloy feed wire;
  (ii) igniting an electric arc between the substrate and the feed wire;
  (iii) decreasing the distance between a surface of the substrate and the feed wire until the feed wire contacts the substrate, thereby causing a short-circuit; and
  (iv) increasing the distance between the substrate and the feed wire to break the short circuit and deposit metal or alloy from the feed wire onto the surface of the substrate to form a metal or alloy attachment on the surface of the substrate.

In step (i) of the process, a metal or alloy substrate and a metal or alloy feed wire are provided. The properties of these are as described above. Suitably, the wire is disposed substantially perpendicularly to the surface of the substrate, such that movement of the wire in an axial direction varies the distance between the wire and the substrate, and movement of the wire in an axial direction towards the substrate brings an end of the wire into contact with the substrate. The movements of the feed wire may be performed manually. However, alternatively, the feed wire may be provided in an automated wire feeder which is mounted on a robotic arm. In this way, the movements of the feed wire are precisely controlled by a computer program.

The substrate may be held or fixed in position on a build plate, as discussed in more detail below.

CMT processes and apparatus are well-known to the skilled person and may be used to perform the process of the present invention.

In step (ii) of the process, an electric arc is ignited between the substrate and the feed wire. The electric arc facilitates partial melting of the metal or alloy at the tip of the wire and partial melting of the metal or alloy of the substrate adjacent the wire, such that transfer of the metal or alloy from the feed wire to the substrate can occur. Means to achieve this are a standard part of CMT processes and well-known to the skilled person, for example, from US 2011/0073579 A1.

After the electric arc has been ignited, in step (iii) of the process the distance between a surface of the substrate and the feed wire is decreased until the feed wire contacts the substrate. The feed wire and substrate are thereby welded. The distance may be decreased by moving the feed wire towards the substrate. The contact between the feed wire and the substrate creates a short-circuit and the electric arc is extinguished.

The final step (iv) of the CMT method comprises increasing the distance between the substrate and the feed wire to break the short circuit and deposit metal or alloy from the feed wire onto the surface of the substrate to form a metal or alloy attachment on the surface of the substrate. Appropriate control of the welding parameters, such as the welding current and the feed wire motion, leads to an attachment of desired geometry.

As explained above, the relative movement of the feed wire and substrate in steps (iii) and (iv) may be automated through the use of a wire feeder mounted on a robotic arm driven by a computer program. The welding current may also be controlled by such a computer program.

By varying the CMT conditions (such as the voltage and/or current of the electric arc, and the timing of the relative movement of the substrate and wire) it is possible to create a variety of attachment geometries.

Non-limiting examples of attachment geometries which are achievable using the CMT method according to the invention include cylindrical (with substantially flat end surface), spherical, 'mushroom' geometries and pike geometries (elongate attachment tapering into a point). Examples of these attachment geometries are shown in the Figures.

The CMT process may be carried out using a CMT system which is commercially available such as the TransPulsSynergic range or CMT Advanced system from Fronius. Such CMT systems are automated and include a wire feeder, a digitally controlled MIG/MAG power source, a cooling unit to cool the welding torch, a wire buffer to facilitate smooth motion of the wire and a robotic welding torch arm for accurate wire feed and constant contact pressure.

The CMT process preferably comprises administering a shielding gas to the region surrounding the electric arc discharge. This may be achieved by either the Metal Inert Gas (MIG) or Metal Active Gas (MAG) techniques well known in CMT processes and in the welding field more generally.

In MIG processes, an inert gas or inert gas mixture is used as a shielding gas and is fed to the region surrounding the electric arc during the CMT process. In some embodiments, the inert gas is selected from Ar, He and mixtures thereof.

In MAG processes, an active gas or active gas mixture is used as the shielding gas during CMT. In some embodiments, the active gas mixture comprises $CO_2$ or $H_2$ or mixtures of these with one or more inert gases.

MIG and MAG processes are sometimes together known as GMAW (Gas Metal Arc Welding).

Preferably, the active gas mixture comprises Ar and $O_2$. The active gas mixture may comprise at least 1.5 vol % $O_2$, for example at least 2 vol %, at least 2.5 vol % or at least 3 vol % $O_2$ and balance Ar. The active gas mixture may comprise up to 6 vol % $O_2$, for example up to 5.5 vol %, up to 5 vol % or up to 4.5 vol % $O_2$ and balance Ar.

Additionally, or alternatively, the active gas mixture comprises Ar and $CO_2$. The active gas mixture may comprise at least 4 vol % $CO_2$, for example at least 4.5 vol % or at least 5 vol % $CO_2$ and balance Ar. The active gas mixture may comprise up to 30 vol % $CO_2$, for example up to 25 vol %, up to 20 vol % or up to 15 vol % $CO_2$ and balance Ar.

As such, the active gas mixture may comprise Ar, $O_2$ and $CO_2$. The active gas mixture may comprise at least 5 vol % $CO_2$, at least 2 vol % $O_2$ and balance Ar. The active gas mixture may comprise up to 15 vol % $CO_2$, up to 10 vol % $O_2$ and balance Ar.

Alternatively, the active gas mixture comprises He, $O_2$ and $CO_2$. The active gas mixture may comprise at least 5 vol % $CO_2$, at least 2 vol % $O_2$ and balance He. The active gas mixture may comprise up to 15 vol % $CO_2$, up to 10 vol % $O_2$ and balance He.

Additionally, or alternatively, the gas mixture comprises $N_2$. This may be considered active or inert, depending on the identity of the metal or alloy to be transferred.

The skilled person understands that the composition of the shielding gas affects the stability of the arc, the metal transfer properties, the amount of spatter and the behaviour of the weld pool, such as its penetration and the resultant mechanical properties of the welded joint between the substrate and the attachment.

In this way (via a CMT process) a 3-dimensional attachment is deposited onto the surface of the substrate.

Optionally, the process comprises the production of a plurality of components of ignition devices using a CMT method, wherein a plurality of substrates is arranged in an array within a single CMT unit. More especially, the process may comprise the steps of providing a plurality of substrates arranged in an array within a single CMT unit such that each step of the process of the present invention may be performed in relation to each substrate simultaneously or sequentially. As such, the process can be considered to be a batch process, providing two or more components in each "run" of the process.

In this way, using a single CMT run it is possible to manufacture a plurality of ignition device components upon a single build plate of the CMT unit. This is highly economical in terms of both time and resources. The feed wire is moved directly from one substrate to the next, with steps (i) to (iv) being performed for each substrate to deposit metal or alloy onto the substrate and form the attachment. By keeping the CMT process conditions the same for each substrate, ignition device components with consistent geometries and properties may be manufactured.

The skilled person will understand that the term "CMT unit" refers to a system which is adapted to perform a CMT process. Such systems are known to the skilled person and are commercially available, as explained above.

By manufacturing a plurality of components, for example at least 2, at least 5, at least 10, at least 15, at least 20, at least 50, at least 100, at least 500, at least 1000, at least 2000 or at least 4000 in a single CMT run upon a single build plate, the process is made much more efficient.

The entire process of cold metal transfer of metal to form a single attachment on a substrate takes a fraction of a second. The process is therefore highly efficient and can be used to manufacture a plurality of ignition device components per second, for example at least 5, at least 10, at least 15, at least 20, at least 25 or at least 30 per second.

Suitably, the plurality of substrates is arranged in a 2-dimensional array on the build plate. In some embodiments, the plurality of substrates is arranged in a regular array, such as a triangular, square or hexagonal array on a build plate. Preferably, the distance between two adjacent substrates is kept to a minimum. This ensures maximum efficiency of the CMT process.

Preferably, the metal or alloy substrate is held upon a build plate during the CMT process. The substrate may be held in position within the build plate by any suitable means or may sit within a suitable bore or recess defined by the build plate. The substrate may be held in position within said bore or recess by suitable means, for example by abutment between a protrusion from the surface of the substrate and a protrusion from the inner surface of the bore or recess. The protrusion from the inner surface of the bore or recess may comprise an annular ridge, such that a more stable platform is provided upon which the substrate rests. In this way, not only the axial position of the substrate is controlled but the lateral position of the substrate is also more stable.

Alternatively, the substrate may sit upon the floor of the recess in the build plate. In this way, the axial position of the substrate within the bore or recess can be controlled, for example in order to ensure that the upper surfaces of the substrate and build plate are coplanar.

The process may therefore comprise, prior to step (i), a step of arranging one or more substrates in position on a build plate.

Optionally, the process of the invention comprises, prior to step (i), providing a modified build plate comprising a bore or recess suitable for holding the metal or alloy substrate during the CMT process, and installing the build plate within an CMT unit. The modified build plate may comprise a plurality of bores or recesses into which an equal plurality of substrates may be placed. The modified build plate may comprise a plurality of bores or recesses arranged in an array, such as a triangular, square or hexagonal array.

When a modified build plate is provided, the process will further comprise a step of inserting one or more substrates into the one or more bores or recesses in the build plate.

Generally, the modified build plate may be provided by drilling a conventional build plate in order to provide a suitable recess or bore.

When a modified build plate comprising one or more recess is provided, the substrate is located within the recess such that the upper surface of the substrate is substantially level with the upper surface of the build plate, or protrudes above the upper surface of the build plate by a clearance of less than or equal to 5 mm. In this way, it can be ensured that, for example, during CMT processes material is deposited only on the upper surface of the substrate.

Suitably the substrates are individually moved (by hand or by robotic means) into position for the CMT process to make contact with the substrate and deposit the metal or alloy attachment.

Preferably the process incorporates an automatic substrate feeding step in which substrates (for example, electrodes) are sorted and arranged in the correct positions and orientation within the CMT machine. For example, the process may involve the use of a feeding machine which is able to provide a predetermined number of substrates and ensure that substrates are provided in the correct orientation. Such feeding machines include vibratory bowl feeders, which are known to the skilled person. In some embodiments, a vibratory bowl feeder is used to place all substrates in the same desired orientation and dispense them one-by-one. The substrates, in the correct orientation provided by the feeding machine, may then be moved into the correct position using a handling robot which may grip one or a plurality of substrates at a time and move them from the output line of the feeding machine to the necessary location within the CMT machine so that the CMT process may be performed.

Thus, the step (i) of providing a metal or alloy substrate in the CMT process according to the first aspect of the invention may include the following steps:
(ia) supplying an unsorted and disoriented plurality of substrates to a feeding machine;
(ib) orienting the substrates into a predetermined desired orientation using the feeding machine; and
(ic) transporting oriented substrates from an output line of the feeding machine into a predetermined desired position within a CMT machine.

In step (ia), the feeding machine may be a vibratory bowl feeder. A plurality of substrates will be fed into the feeding machine and will be oriented into the same orientation by vibration of the machine and motion of a conveyor. Substrates may be supplied to the feeding machine batch-wise, or a continuous supply may be provided. The plurality of substrates may all be identical, or may include groups of non-identical substrates, for example substrates of various sizes and/or various shapes. In the latter case, the feeding machine may also sort the substrates into different output lines based on their size and/or shape.

In step (ib) the plurality of substrates emerge from the feeding machine in a desired orientation, ready for collection and transportation to the CMT machine.

In step (ic), substrates may be transported manually or preferably using a handling robot. Suitable handling robots are known to the skilled person and are able to grasp and transport a plurality of bodies such as the substrates described herein.

In this way, an automated process is provided in which an unsorted quantity of substrates is sorted and arranged in the correct position and orientation necessary for CMT to take place in a very efficient manner without the need for human monitoring or intervention.

Metal or Alloy Attachment

The product of the CMT process according to one aspect of the invention is a component of an ignition device which is an assembly comprising the metal or alloy substrate and a deposited metal or alloy attachment which is fused to the substrate.

The product of the CMT process according to an alternative aspect of the invention is a noble metal-containing component comprising the metal or alloy substrate and a CMT deposited attachment comprising a noble metal or alloy thereof, which is fused to the substrate.

The disclosure above in relation to the properties of the metal or alloy wire also applies to the metal or alloy attachment, which is an object created by transfer of metal or alloy from the feed wire to the substrate.

The attachment may have a tapered shape such that its cross-sectional area decreases with distance from the substrate to which it is attached.

Alternatively, the attachment may have a convex shape, for example a hemispherical shape or the shape of a spherical cap or dome.

Preferably, the attachment is the sparking tip of an electrode for use in an ignition device.

When the attachment is formed from a PGM metal or alloy, this provides particularly desirable properties when the attachment is used as the sparking tip. For example, the attachment has high melting temperature and is less prone to spark erosion, thereby reducing the risk of mis-fire of the ignition device.

The size of the attachment will of course depend on the size of the substrate and the intended application, and the skilled person can adjust the CMT method in order to manufacture an attachment of suitable size.

Suitably, the attachment has a length of at least 0.1 mm, for example at least 0.2 mm, at least 0.25 mm, at least 0.3 mm, at least 0.35 mm or at least 0.4 mm. In addition, suitably, the attachment has a length of up to 10 mm, for example up to 5 mm, up to 4 mm, up to 3 mm, for example up to 2.5 mm or up to 2 mm.

Suitably, the attachment has a width (diameter) of at least 0.3 mm, for example at least 0.4 mm or at least 0.5 mm. Preferably, the attachment may have a width (diameter) of up to 2.5 mm, for example up to 2 mm or up to 1.5 mm.

Generally, the gauge of the wire is preserved upon formation of the attachment, so the wire gauge chosen determines the thickness of the attachment formed during CMT. Other dimensions of the attachment, such as its height as measured from the substrate surface, the diameter of any spherical features formed and the base penetration depth of the attachment are determined by the power source program of the CMT system.

Optionally, the process of the invention further comprises a step (v) selected from surface finishing and/or mechanical processing of at least a part of the component.

The surface finishing step may comprise a 3D scanning process to determine the three-dimensional position of each component on the build plate and to feed this information into the CNC machining system. The accuracy of CNC finishing may depend upon the positioning accuracy of the substrates. So, performing a 3D scan of the substrate positions after welding ensures that the surface finishing process is accurate.

Mechanical processing may include any process known to the skilled person for use to change the structure and/or density of CMT deposited structures. Non-limiting examples of mechanical processing techniques which may be used in step (iv) include bead peening, mechanical peening, hot or cold rolling or pressing, such as isostatic pressing, for example hot isostatic pressing and additive layer manufacturing (ALM).

The mechanical processing may comprise a densification process. Densifying is a means to reduce the internal porosity of the CMT manufactured part. In this way, a denser attachment can be provided.

The mechanical processing may be used to introduce controlled levels of mechanical work, which can either be left or be utilised in combination with moderate localised heating to create an equiaxed grain structure at the surface, or deeper depending on severity of treatment and the thermal regime employed. In some cases, the equiaxed structure may be created at the joint with the substrate with the epitaxially grown directional grains being confined to the surface of the attachment. Such varied structures are expected to lead to improved stability of the electrode tip in respect of oxidation/corrosion but more significantly thermal and mechanical cycling. It will be appreciated that this may be particularly advantageous for the production of electrode tips in ignition devices.

The invention will now be further described with reference to the following non-limiting Figures and Examples. Other embodiments of the invention will occur to those skilled in the art in the light of these.

DETAILED DESCRIPTION

Figure 1:
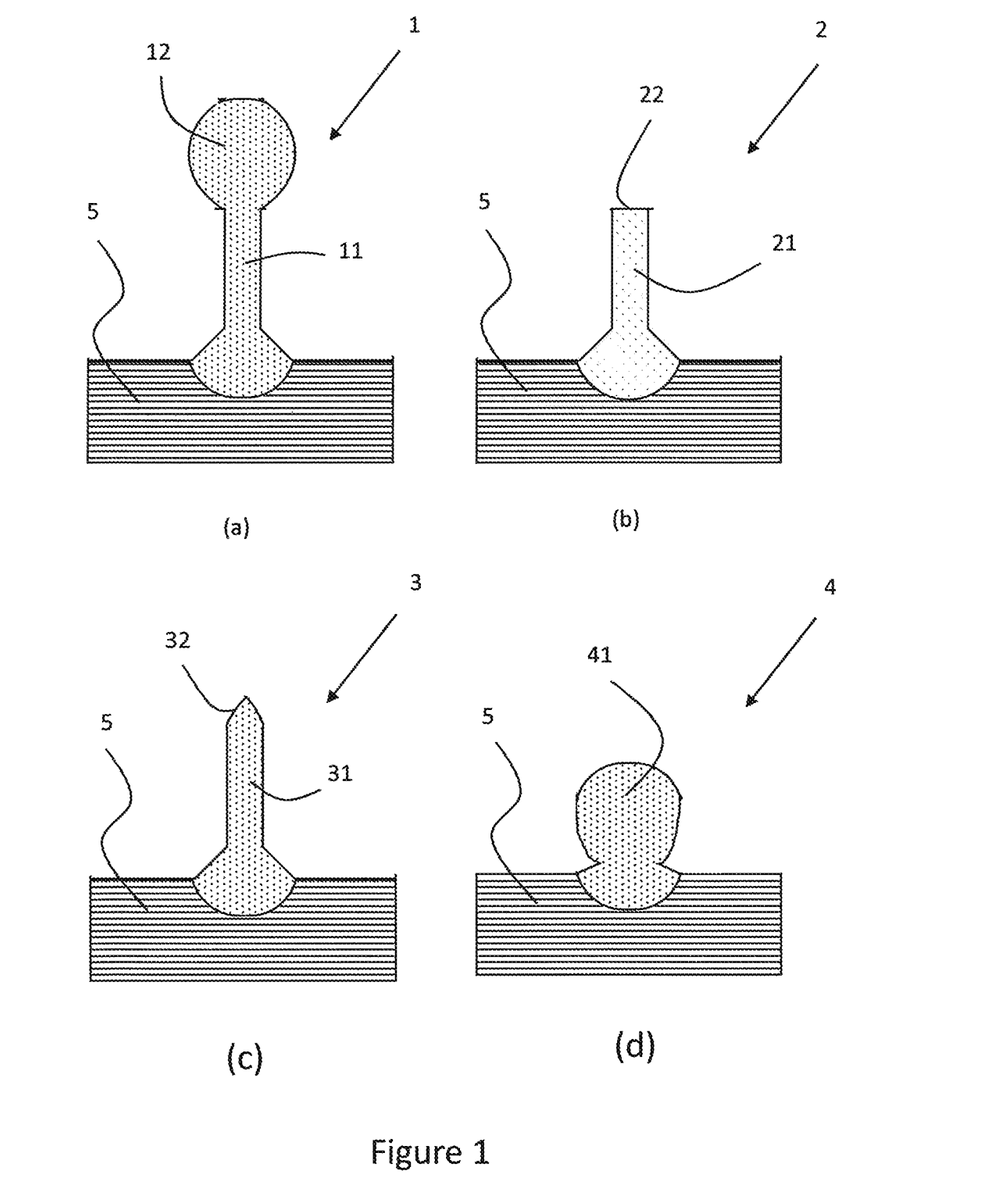
FIG. 1 shows various schematic cross-sectional representations of attachment geometries achievable using the CMT process of the invention.

FIG. 1 shows some of the possible 'pin' geometries which are possible to manufacture using the CMT process according to the invention.

Each of FIGS. 1 (a)-(d) show a different 'pin' geometry. In each case, an attachment has been deposited by CMT onto a substrate 5, which may be an ignition device electrode.

FIG. 1(a) shows an embodiment 1 in which an attachment ('pin') 11 with 'mushroom' geometry is attached to a substrate 5. The attachment 11 has a spherically shaped terminal portion 12 which extends to a greater diameter than the main stem of the attachment. The attachment 11 has been securely fixed to the substrate 5 by CMT from a metal or alloy feed wire. The substrate 5 may be Inconel alloy and the attachment 11 may be a noble metal or alloy thereof.

FIG. 1(b) shows an embodiment 2 in which an attachment ('pin') 21 with a 'flat' geometry is attached to a substrate 5. The attachment 21 has a terminal portion 22 which has a substantially planar end surface, such that the geometry of the attachment is substantially cylindrical. The attachment 21 has been securely fixed to the substrate 5 by CMT from a metal or alloy feed wire. The substrate 5 may be Inconel alloy and the attachment 21 may be a noble metal or alloy thereof.

FIG. 1(c) shows an embodiment 3 in which an attachment ('pin') 31 with a 'pike' or 'conical' geometry is attached to a substrate 5. The attachment 31 has a tapered terminal portion 32 which provides the terminal portion with a substantially conical geometry. The attachment 31 has been securely fixed to the substrate 5 by CMT from a metal or alloy feed wire. The substrate 5 may be Inconel alloy and the attachment 31 may be a noble metal or alloy thereof.

FIG. 1(d) shows an embodiment 4 in which an attachment ('pin') 41 with 'ball' geometry is attached to a substrate 5. The attachment 41 has a spherical geometry similar to the terminal portion of the attachment 11 shown in FIG. 1(a), however the attachment 41 lacks the elongate stem portion present in attachment 11. The attachment 41 has been securely fixed to the substrate 5 by CMT from a metal or alloy feed wire. The substrate 5 may be Inconel alloy and the attachment 41 may be a noble metal or alloy thereof.

When present in an ignition device component, such as an electrode of a spark plug, any of the embodiments shown in FIG. 1 would provide the advantages described herein and could be manufactured in an efficient and economical manner, with minimal waste material.

Figure 2:
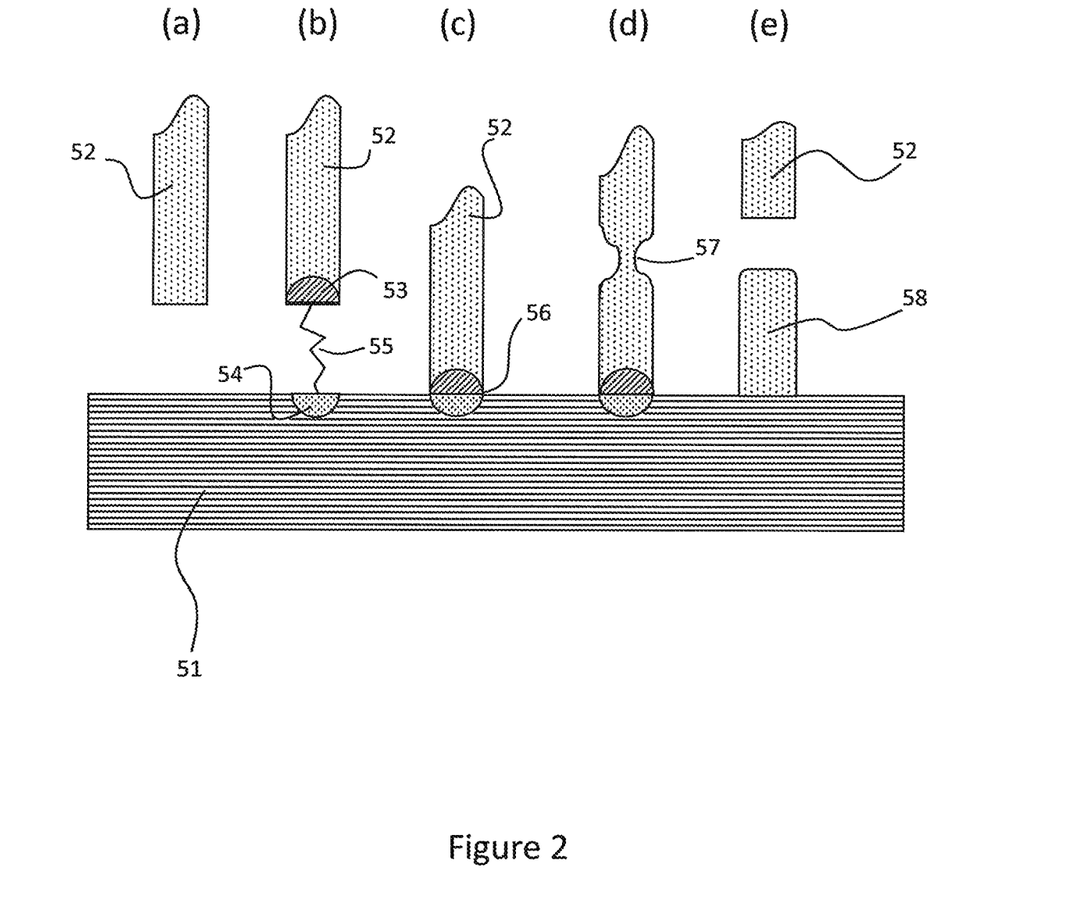

FIG. 2 is a schematic, cross-sectional representation of a typical cycle of the CMT process according to the invention. Steps (a)-(e) of FIG. 2 represent steps through time within a single cycle (single attachment deposition) of the CMT process.

A substrate 51 is provided which is typically a transition metal or alloy thereof, such as a Ni—Cr alloy. The substrate 51 may be Inconel.

In step (a) of FIG. 2, a feed wire 52 is provided adjacent the substrate 51, and the feed wire is oriented such that its axis is substantially perpendicular to the surface of the substrate 51. The feed wire is typically a noble metal or alloy thereof, such as an alloy of Ru or Ir. Although not shown in the Figure, the feed wire 52 is held in a wire feeder mounted on a robotic arm which is part of a CMT system, such as the Fronius TransPulsSynergic system.

In step (b) of FIG. 2, an electric arc 55 is ignited between the tip of the feed wire 52 and the portion of the surface of the substrate 54 which is adjacent the feed wire. The electric arc causes local partial melting in a zone 53 at the tip of the feed wire 52 and a zone 54 at the surface of the substrate 51. The ignition of the arc is controlled automatically by the CMT system, as is the voltage and current of the arc.

The distance between the feed wire 52 and the substrate 51 is then decreased, for example by moving the wire feeder (not shown) or wire towards the substrate 51, until, as shown in step (c) of FIG. 2, the feed wire 52 and substrate 51 come into contact, creating a short-circuit. This creates a weld 56 between the feed wire 52 and substrate 51.

In step (d) of FIG. 2 the distance between the feed wire 52 and the substrate 51 is increased, for example by moving the wire feeder (not shown) or wire away from the substrate 51 again. This creates a pinched portion 57 in the feed wire which eventually breaks to leave an attachment 58 welded to the surface of the substrate 51. The geometry of the attachment 58 shown in FIG. 2 is 'flat', but the exact geometry can be varied by adjustment of welding parameters, such as the welding voltage, current and feed wire movement.

After step (e) the feed wire 52 can be moved by the robotic arm to another location (for example, adjacent another substrate), to deposit another attachment in the same way or deposit another attachment in the same way but with an alternative shape.

The invention claimed is:

1. A process for the production of an ignition device component by cold metal transfer comprising:
   (i) providing a metal or alloy substrate and a metal or alloy feed wire, wherein the feed wire comprises a platinum group metal or platinum group metal containing alloy;
   (ii) igniting an electric arc between the substrate and the feed wire;
   (iii) decreasing the distance between a surface of the substrate and the feed wire until the feed wire contacts the substrate, thereby creating a short-circuit; and
   (iv) increasing the distance between the substrate and the feed wire to break the short circuit and deposit metal or alloy from the feed wire onto the surface of the substrate to form a metal or alloy attachment on the surface of the substrate.

2. A process according to claim 1, wherein the substrate comprises nickel or a nickel alloy, optionally comprising a copper core.

3. A process according to claim 2, wherein the substrate comprises Inconel alloy.

4. A process according to claim 1, comprising the production of a plurality of components using a cold metal transfer method, wherein a plurality of substrates is arranged in an array within a single cold metal transfer unit.

5. A process according to claim 4, comprising performing steps (i) to (iv) for each substrate in the array simultaneously or sequentially.

6. A process according to claim 4, wherein the spacing between central points on adjacent substrates is in the range 1 to 10 mm.

7. A process according to claim 1, wherein the substrate is located within a recess or bore in a build plate of a cold metal transfer unit.

8. A process according to claim 7, wherein the substrate is located within the recess such that the upper surface of the substrate is substantially level with the upper surface of the build plate, or protrudes above the upper surface of the build plate by a clearance of less than or equal to 5 mm.

9. A process according to claim 7, wherein the substrate is held in position within the recess or bore.

10. A process according to claim 9, wherein the substrate is held in position by means of abutment between a protrusion from the surface of the substrate and a protrusion from the inner surface of the bore.

11. A process according to claim 1, wherein the step (i) of providing a metal or alloy substrate includes the following steps:
 (ia) supplying an unsorted and disoriented plurality of substrates to a feeding machine;
 (ib) orienting the substrates into a predetermined desired orientation using the feeding machine; and
 (ic) transporting oriented substrates from an output line of the feeding machine into a predetermined desired position within a cold metal transfer unit.

12. A process according to claim 11, wherein the substrates are transported using a handling robot, optionally wherein the handling robot transports a plurality of substrates at a time.

13. A process according to claim 1, further comprising a step (v) selected from surface finishing and/or isostatic pressing of at least a part of the component.

14. A process according to claim 1, which is a process for the production of a central or ground electrode of a spark plug.

15. A process according to claim 14, which is a process for forming the tip of a central electrode of a spark plug on a substrate which represents the remainder of the central electrode.

16. An ignition device component obtained or obtainable by a process according to claim 1.

17. An ignition device component according to claim 16, which is an ignition device electrode.

18. A process for the production of a noble metal-containing component by cold metal transfer comprising:
 (i) providing a metal or alloy substrate and a feed wire, wherein the feed wire comprises a noble metal or noble metal-containing alloy;
 (ii) igniting an electric arc between the substrate and the feed wire;
 (iii) decreasing the distance between a surface of the substrate and the feed wire until the feed wire contacts the substrate, thereby creating a short-circuit; and
 (iv) increasing the distance between the substrate and the feed wire to break the short circuit and deposit metal or alloy from the feed wire onto the surface of the substrate to form a metal or alloy attachment on the surface of the substrate.

19. A process according to claim 18, wherein the feed wire comprises a metal or alloy selected from the metals Ru, Rh, Pd, Ag, Os, Ir, Pt and Au, and alloys thereof.

20. A process according to claim 19, which is a process for the production of a PGM-containing component, wherein the feed wire comprises a platinum group metal selected from Ru, Rh, Pd, Ir and Pt or an alloy thereof.

* * * * *